United States Patent [19]

Fukumochi et al.

[11] Patent Number: 5,644,774
[45] Date of Patent: Jul. 1, 1997

[54] MACHINE TRANSLATION SYSTEM HAVING IDIOM PROCESSING FUNCTION

[75] Inventors: Yoji Fukumochi, Ikoma-gun; Toshiyuki Okunishi, Higashiosaka; Ichiko Sata, Nara; Takeshi Kutsumi, Yamatokoriyama, all of Japan

[73] Assignee: Sharp Kabushiki Kaisha, Osaka, Japan

[21] Appl. No.: 428,547

[22] Filed: Apr. 25, 1995

[30] Foreign Application Priority Data

Apr. 27, 1994 [JP] Japan .................. 6-090053

[51] Int. Cl.$^6$ .................. G06F 17/28
[52] U.S. Cl. .................. 395/754; 395/752; 395/757; 395/794
[58] Field of Search .................. 395/752, 754, 395/755, 757, 759, 760, 794, 710

[56] References Cited

U.S. PATENT DOCUMENTS

| | | | |
|---|---|---|---|
| 4,641,264 | 2/1987 | Nitta et al. | 395/754 |
| 5,475,586 | 12/1995 | Sata et al. | 395/754 |
| 5,541,838 | 7/1996 | Koyama et al. | 395/754 |

FOREIGN PATENT DOCUMENTS 6-193272  5/1994  Japan .

*Primary Examiner*—Jeffery Hofsass
*Assistant Examiner*—Andrew Hill
*Attorney, Agent, or Firm*—Nixon & Vanderhye P.C.

[57] ABSTRACT

A machine translation system having an idiom processing function is disclosed, which includes a keyboard for inputting a word sequence of a first language; a dictionary memory for storing therein idioms of the first language including at least two fixed portions and a variable portion interposed therebetween as headers and translated expressions in a second language corresponding to the respective headers; and a control processor for performing a registration process for newly or additionally registering a header of the first language and translated expressions in the second language corresponding to the header into the dictionary memory, a dictionary lookup process for retrieving a header corresponding to an idiom included in the word sequence of the first language input by means of the keyboard from the headers stored in the dictionary memory by comparing the word sequence of the first language with each of the headers, and an idiom processing process for normalizing an arrangement of fixed portions in a word sequence of the first language which is identified with one of the headers in the dictionary lookup process.

8 Claims, 16 Drawing Sheets

Fig.4

[1 a] English — both *N1 and_* *N2
English part of speech — C D
English part of speech 2 — C C
Translated expression — *N1 と *N2 の両方
Part of speech of translated expression — Noun
Translation attribution — ——

[1 b] English — neither *N1 nor_* *N2
English part of speech — C D
English part of speech 2 — C C
Translated expression — *N1 と *N2 のいずれも
Part of speech of translated expression — Noun
Translation attribution — Negative sentence

[2 a] English — so *A that_* *C
English part of speech — C D
English part of speech 2 — A C
Translated expression — *C [体：ほど] *A
Part of speech of translated expression — ——
Translation attribution — ——

[2 b] English — too *a to_* *B
English part of speech — C D O M
English part of speech 2 — T O
Translated expression — *B [体：] には あまりにも *a
Part of speech of translated expression — ——
Translation attribution — ——

[2 c] English — the same *n that_* *C
English part of speech — C D
English part of speech 2 — A C
Translated expression — *C [体：] のと 同じ *n
Part of speech of translated expression — ——
Translation attribution — ——

Fig.5

[3 a]  English                              so *v  that_* *C
       English part of speech               C D
       English part of speech 2             A C
       Translated expression                *C [体:] ように  *v
       Part of speech of translated
       expression                           Verb
       Translation attribution              ――

Symbol Explanation

| Symbol | English nomenclature |
|--------|----------------------|
| P N | Pronoun |
| D T | Determiner |
| B E | BE(copula) |
| C D | Collocational Idiom |
| A V | Adverb |
| A J | Adjective |
| T H | that-complementizer |
| R P | Relative Pronoun |
| N N | Noun |
| A X | Auxiliary |
| V B | Verb |
| C C | Coordinate Conjunction |
| A C | Subordinate Conjunction |
| T O | To |

Fig.6

Exemplary representative symbol table

| Terminal representative symbol | | Non-terminal representative symbol | |
|---|---|---|---|
| Representative symbol | Part of speech | Representative symbol | Part of speech |
| * n | Noun | * N | Noun phrase |
| * a | Adjective | * A | Adjectival phrase |
| * d | Adverb | * D | Adverbial phrase |
| * p | Preposition | * P | Prepositional phrase |
| * v | Verb | * J | Restrictive adjectival phrase |
| * x | Auxiliary verb | * B | To-infinitive |
| * c | Conjunction | * C | Sentence |
| | | * T | That-clause |

Fig. 9

Dictionary lookup result buffer A-1

| Word position | Candidate Character string | 0 Word number | 0 Part of speech | 0 Type | 0 Pointer | 1 Word number | 1 Part of speech | 1 Type | 1 Pointer | 2 Word number | 2 Part of speech | 2 Type | 2 Pointer | 3 Word number | 3 Part of speech | 3 Type | 3 Pointer |
|---|---|---|---|---|---|---|---|---|---|---|---|---|---|---|---|---|---|
| 0 | I | 1 | PN | | | | | | | | | | | | | | |
| 1 | have | 1 | HA | | | 1 | VB | | | | | | | | | | |
| 2 | both | 1 | CD | S | 4/0 | 1 | PN | | | 1 | DT | | | 1 | AV | | |
| 3 | A | 1 | NN | | | 1 | NN | | | | | | | | | | |
| 4 | and | 1 | CC | | | | | | | | | | | | | | |
| 5 | B | 1 | NN | | | | | | | | | | | | | | |
| 6 | | 1 | END | | | | | | | | | | | | | | |

Fig. 10

Dictionary lookup result buffer A-2

| Word position | Candidate Character string | 0 Word number | 0 Part of speech | 0 Type | 0 Pointer | 1 Word number | 1 Part of speech | 1 Type | 1 Pointer | 2 Word number | 2 Part of speech | 2 Type | 2 Pointer | 3 Word number | 3 Part of speech | 3 Type | 3 Pointer |
|---|---|---|---|---|---|---|---|---|---|---|---|---|---|---|---|---|---|
| 0 | This | 1 | PN | | | 1 | DT | | | | | | | | | | |
| 1 | is | 1 | BE | | | | | | | | | | | | | | |
| 2 | so | 1 | CD | S | 4/0 | 1 | AV | | | | | | | | | | |
| 3 | hot | 1 | AJ | | | | | | | | | | | | | | |
| 4 | that | 1 | TH | | | 1 | DT | | | 1 | PN | | | 1 | RP | | |
| 5 | children | 1 | NN | | | | | | | | | | | | | | |
| 6 | cannot | 1 | AX | | | | | | | | | | | | | | |
| 7 | drink | 1 | VB | | | 1 | NN | | | | | | | | | | |
| 8 | it | 1 | PN | | | | | | | | | | | | | | |
| 9 | | 1 | END | | | | | | | | | | | | | | |

Fig. 11

Dictionary lookup result buffer A-1

| Word position | Character string | 0 | | | | 1 | | | | 2 | | | | 3 | | | |
|---|---|---|---|---|---|---|---|---|---|---|---|---|---|---|---|---|---|
| | | Word number | Part of speech | Type | Pointer | Word number | Part of speech | Type | Pointer | Word number | Part of speech | Type | Pointer | Word number | Part of speech | Type | Pointer |
| 0 | I | 1 | PN | | | | | | | | | | | | | | |
| 1 | have | *2 | HA | | 4/0 | *2 | VB | | 4/0 | 1 | HA | | 4/1 | 1 | VB | | 4/1 |
| 2 | both | 1 | PN | | | 1 | DT | | | 1 | AV | | | | | | |
| 3 | A | 1 | NN | | | | | | | | | | | | | | |
| 4 | and | *1 | CC | P | 1/0<br>1/1 | 1 | CC | | 1/2<br>1/3 | | | | | | | | |
| 5 | B | 1 | NN | | | | | | | | | | | | | | |
| 6 | | 1 | END | | | | | | | | | | | | | | |

Fig. 12

Dictionary lookup result buffer A-2

| Word position | Candidate Character string | 0 Word number | 0 Part of speech | 0 Type | 0 Pointer | 1 Word number | 1 Part of speech | 1 Type | 1 Pointer | 2 Word number | 2 Part of speech | 2 Type | 2 Pointer | 3 Word number | 3 Part of speech | 3 Type | 3 Pointer |
|---|---|---|---|---|---|---|---|---|---|---|---|---|---|---|---|---|---|
| 0 | This | 1 | PN | | | 1 | DT | | | | | | | | | | |
| 1 | is | *2 | BE | | 4/0 | 1 | BE | | | | | | | | | | |
| 2 | so | 1 | AV | | | | | | | | | | | | | | |
| 3 | hot | 1 | AJ | | | | | | | | | | | | | | |
| 4 | that | *1 | AC | P | 1/0 | 1 | TH | | 1/1 | 1 | DT | | 1/1 | 1 | PN | | 1/1 |
| 5 | children | 1 | NN | | | | | | | | | | | | | | |
| 6 | cannot | 1 | AX | | | | | | | | | | | | | | |
| 7 | drink | 1 | VB | | | 1 | NN | | | | | | | | | | |
| 8 | it | 1 | PN | | | | | | | | | | | | | | |
| 9 | | 1 | END | | | | | | | | | | | | | | |

(Word number column at candidate 2: 4/1, 4/2, 4/3, ...)

Fig. 13

Dictionary lookup result buffer A-3

| Word position | Character string | Candidate 0 | | | | Candidate 1 | | | | Candidate 2 | | | | Candidate 3 | | | |
|---|---|---|---|---|---|---|---|---|---|---|---|---|---|---|---|---|---|
| | | Word number | Part of speech | Type | Pointer | Word number | Part of speech | Type | Pointer | Word number | Part of speech | Type | Pointer | Word number | Part of speech | Type | Pointer |
| 0 | This | 1 | PN | | | 1 | DT | | | | | | | | | | |
| 1 | is | 1 | BE | | | | | | | | | | | | | | |
| 2 | so | 1 | CD | S | 4/0 | 1 | AV | | | | | | | | | | |
| 3 | designed | 1 | VB | | | | | | | | | | | | | | |
| 4 | that | 1 | TH | | | 1 | DT | | | 1 | PN | | | 1 | RP | | |
| 5 | everyone | 1 | PN | | | | | | | | | | | | | | |
| 6 | can | 1 | AX | | | | | | | | | | | | | | |
| 7 | operate | 1 | VB | | | | | | | | | | | | | | |
| 8 | it | 1 | PN | | | | | | | | | | | | | | |
| 9 | easily | 1 | AV | | | | | | | | | | | | | | |
| 10 | | 1 | END | | | | | | | | | | | | | | |

Fig. 14

Dictionary lookup result buffer A-3

| Word position | Character string | Candidate 0 | | | | 1 | | | | 2 | | | | 3 | | | |
|---|---|---|---|---|---|---|---|---|---|---|---|---|---|---|---|---|---|
| | | Word number | Part of speech | Type | Pointer | Word number | Part of speech | Type | Pointer | Word number | Part of speech | Type | Pointer | Word number | Part of speech | Type | Pointer |
| 0 | This | 1 | PN | | | 1 | DT | | | | | | | | | | |
| 1 | is | *2 | BE | | 4/0 | 1 | BE | | | 4/1, 4/2, 4/3 ... | DT | | | | | | |
| 2 | so | 1 | AV | | | 1 | AV | | | | | | | | | | |
| 3 | designed | 1 | VB | | | | | | | | | | | | | | |
| 4 | that | *1 | AC | P | 1/0 | 1 | TH | | 1/1 | 1 | DT | | 1/1 | 1 | PH | | 1/1 |
| 5 | everyone | 1 | PN | | | | | | | | | | | | | | |
| 6 | can | 1 | AX | | | | | | | | | | | | | | |
| 7 | operate | 1 | VB | | | | | | | | | | | | | | |
| 8 | it | 1 | PN | | | | | | | | | | | | | | |
| 9 | easily | 1 | AV | | | | | | | | | | | | | | |
| 10 | | 1 | END | | | | | | | | | | | | | | |

Representative symbol table

Fig. 15

| Terminal representative symbol | |
|---|---|
| * m | Numeral |
| * 1 | Possessive pronoun |
| * 2 | Reflexive pronoun |
| * 3 | Subjective pronoun |
| * 4 | Objective pronoun |
| * n | Noun |
| * a | Adjective |
| * d | Adverb |
| * p | Preposition |
| * v | Verb |
| * x | Auxiliary verb |
| * c | Conjunction |

| Non-terminal representative symbol | |
|---|---|
| * C | Clause |
| * T | That-clause |
| * I | To-infinitive |
| * N | Noun phrase |
| * A | Descriptive adjectival phrase |
| * P | Prepositional phrase |
| * J | Restrictive adjectival phrase |
| * D | Adverbial phrase |

Fig. 16

English: (3 a) This is "so" designed "that" everyone can operate it easily.

Japanese: (3 b) これは、"そのように" 設計されている" ので"、
translation   みんながそれを容易に操作できる。

```
            Subordinate conjunction
                    ↓
This  is  so designed  that everyone can operate it easily.
      ↑_____↑
      Passive-voice verbal phrase
```

MACHINE TRANSLATION SYSTEM HAVING IDIOM PROCESSING FUNCTION

BACKGROUND OF THE INVENTION

1. Field of the Invention

The present invention relates to machine translation systems and, more particularly, to machine translation systems having an idiom processing function which are capable of registering, retrieving and translating idioms.

2. Description of Related Arts

Conventional language processing systems for practical use include word processors for supporting documentation and machine translation systems for translating a document from one language to another language.

These language processing systems have a dictionary for storing therein a multiplicity of unit items each including a header and various kinds of information associated thereto. Headers include not only words of a natural language such as English or Japanese but also sequences of words (such as phrases and correlated words) which are taken as a whole to express a certain meaning, i.e., idioms. Some consist of consecutive words like "high school", and others consist of split words like "so . . . that" (split idioms).

In a translation process, the interrelation between a split idiom of a source language and an equivalent expression of a target language varies case by case and, hence, it is difficult to handle the split idioms. Exemplary split idioms are shown below:

I have "both" A "and" B. (1a)

I have "neither" A "nor" B. (1b)

This is "so" hot "that" children cannot drink it. (2a)

This is "too" hot "to" drink it. (2b)

This is "the same" book "that" you bought. (2c)

A conventional machine translation system introduces representative symbols as shown in FIG. 15 when registering such split idioms into a dictionary, so that idioms having a variable portion consisting of a single word as well as a word sequence can be processed for translation. Japanese Unexamined Patent Publication HEI 6(1994)-139272 discloses a machine translation system which registers idioms by using the representative symbols.

For example, idioms included in the above sentences are registered in the following manner:

Idiom registration for the sentence (1a)

| Idiom in English | both *N1 and *N2 (1) |
| --- | --- |
| Part of speech | noun phrase |
| Translation | *N1 と *N2 の両方 |
| Part of speech | others (2) |

1: *N means a noun phrase
2: "Others" includes noninflectional nouns, adverbs and the like.

Idiom registration for the sentence (1b)

| Idiom in English | neither *N1 nor *N2 |
| --- | --- |
| Part of speech | noun phrase |
| Translation | *N1 も *N2 も |
| Part of speech | others |

Idiom registration for the sentence (2a)

| Idiom in English | so *A that *c |
| --- | --- |
| Part of speech | adjective |
| Translation | *c [体:] ほど *A |
| Part of speech | (3) |

3: Since the part of speech of the translated idiom is determined by the part of speech of a word or word sequence *A in the translation, the part of speech thereof is not specified.

Idiom registration for the sentence (2b)

| Idiom in English | too *a to *I |
| --- | --- |
| Part of speech | adjective |
| Translation | *I [体:] にはあ まりに も *a |
| Part of speech | (4) |

4: Since the part of speech of the translated idiom is determined by the part of speech of a word or word sequence *a in the translation, the part of speech thereof is not specified.

Idiom registration for the sentence (2c)

| Idiom in English | the same *n that *C |
| --- | --- |
| Part of speech | noun |
| Translation | *C [体:] のと同 じ *n |
| Part of speech | (5) |

5: Since the part of speech of the translated idiom is determined by the part of speech of a word or word sequence *n in the translation, the part of speech thereof is not specified.

In this prior art, an idiom matchable with an input word sequence is retrieved from the idioms registered as shown above in the dictionary, and the syntax of words or word sequences represented by representative symbols is analyzed. Based on the result of the syntactical analysis, a translation corresponding to the idiom in the input word sequence is generated by using a translated expression registered as shown above.

Where a variable portion separating the constituents of the idiom is a word sequence or a phrase, i.e., where a representative symbol (a non-terminal representative symbol as shown in FIG. 15) representing a word sequence in an idiom header corresponds to the variable portion, the translation system of the prior art cuts out the variable portion to perform a syntactical analysis only for the variable portion.

Then, if the syntactical analysis is successfully completed, the translation system generates a translation of the variable portion, and inserts the translation into a translated expression of the idiom header. After a portion corresponding to the idiom is thus translated, the system translates the entire sentence by a recursive process.

A prior-art translation system having no such special registration means requires special rules as shown below to process split idioms.

In the sentence (1a), for example, a word sequence "both A and B" which is an object of the verb "have" functions as a noun phrase. Therefore, a rule is required to define the syntax of the noun phrase as follows:

Noun phrase→correlative word 1+noun phrase+correlative word 2+noun phrase where the correlative words 1 and 2 correspond to words "both" and "and", and the first and second noun phrases correspond to "A" and "B", respectively, in the sentence (1a).

Thus, the rule is designed so as to include special parts of speech such as the correlative words 1 and 2. In case of the sentence (1a), a translation "の両方"(no ryouhou) is assigned to the word "both" corresponding to the correlative word 1, and a translation "と"(to) is assigned to the word "and" corresponding to the correlative word 2.

Then, a translation "AとBの両方"(A to B no ryouhou) is assigned to this idiom.

In case of the sentence (2a), a word sequence "so hot that children cannot drink it" functions as a complement of a word "is". Therefore, another rule is required to define the syntax of the adjective phrase as follows:

Adjective phrase→correlative word 1+adjective+correlative word 2+clause where the correlative words 1 and 2 correspond to words "so" and "that", respectively.

Similarly, still another rule is required to define the syntax of the adjective phrase in the sentence (2b) as follows:

Adjective phrase→correlative word 1+adjective+correlative word 2+verb phrase

Yet another rule is required to define the syntax of the noun phrase in the sentence (2c) as follows:

Noun phrase→correlative word 1+noun+correlative word 2+clause (no object)

To merely cover the aforesaid five idiomatic expressions, four rules are required.

The correlative word 1 should be compatible with the correlative word 2 in each of the idiomatic expressions, and the combination thereof is predetermined. In the sentences (1a) and (1b), for example, the word sequences "both A and B" and "neither A nor B" are correct, but a word sequence "both A nor B" is incorrect. That is, the words "both" and "neither" are compatible with "and" and "nor", respectively. Therefore, additional information concerning the compatible combination of the correlative words 1 and 2 should be described in the dictionary.

In the conventional translation system, idiom headers registered in the dictionary can include a variable portion in the form of phrase and, therefore, the generality of the idiom headers can significantly be improved. However, the matching of the variable portion is performed only after a phrase corresponding to the variable portion is extracted from a source text and subjected to a syntactical analysis process, transformation process and generation process.

If the syntactical analysis of the variable portion fails, the syntactical analysis process for the variable portion is recursively performed many times and, therefore, the overhead for this process is increased. More specifically, as idiom headers having variable phrases are increasingly registered in the dictionary, more time is required for the matching of an idiom header. Therefore, the throughput of the entire translation process may be reduced by the registration of an idiom header including a variable portion of an unexpected syntax.

Further, as previously stated, the provision of numerous special exceptional rules may be disadvantageous in terms of the throughput. Even if all the rules such as the aforesaid grammatical rules possibly required for the translation process are prepared and the information concerning the compatible combination of correlative words is registered for each of the idiom headers in the dictionary, the following problems will arise.

In case of a sentence (3a) as shown in FIG. 16, in which words "is" and "designed" constitute a passive-voice verbal phrase and words "so" and "that" constitute a subordinate conjunction, the syntactical relation of the former crosses the syntactical relation of the latter. Therefore, a grammatical rule for processing such a syntax cannot be described.

More specifically, assuming that there is a sentence "abcd" consisting of four words, in which "a" directly relates to "b" and "c" directly relates to "d", the following three grammatical rules can be applied to this sentence.

$X \rightarrow ab$ ("a" relates to "b", and "X" is generated by arranging "a" and "b" in this order.)

$Y \rightarrow cd$ ("c" relates to "d", and "Y" is generated by arranging "c" and "d" in this order.)

$Z \rightarrow XY$ ("X" relates to "Y", and "Z" is generated by arranging "X" and "Y" in this order.)

$Z=[X, Y]=[(a, b), (c, d)]=abcd$

However, if "a" relates to "c" and "b" relates to "d", i.e., the syntactical relation of the former crosses the syntactical relation of the latter, the syntax of this sentence cannot be described in accordance with the aforesaid grammatical rules.

The conventional machine translation system requires numerous grammatical rules to describe the syntactical relation between separated words in a split idiom. Even if exceptional rules are prepared to process split idioms, the syntax such as of the sentence (3a) cannot be properly analyzed for correct translation. This is because sentences of a source language may include various kinds of split idioms and increased number of exceptional processes are required for the processing of these split idioms.

SUMMARY OF THE INVENTION

In accordance with the present invention, there is provided a machine translation system having an idiom processing function which comprises: an input means for inputting a word sequence of a first language; a dictionary means for storing therein idioms of the first language including at least two fixed portions and a variable portion interposed therebetween as headers and translated expressions in a second language corresponding to the respective headers; a registration means for newly or additionally registering a header of the first language and translated expressions in the second language corresponding to the header into the dictionary means; a dictionary lookup means for retrieving a header corresponding to an idiom included in the word sequence of the first language input by the input means from the headers stored in the dictionary means by comparing the word sequence of the first language with each of the headers; and an idiom processing means for normalizing an arrangement of fixed portions in a word sequence of the first language which is identified with one of the headers by the dictionary lookup means.

According to the present invention, the arrangement of the fixed portions of the idiom included in the word sequence which is identified with one of the headers in the dictionary is normalized. Therefore, a translation of a split idiom can be generated by using ordinary grammatical rules without defining any special grammatical rule for the translation process. Further, even if one syntactical relation between words constituting the idiom crosses another syntactical relation, a correct translation can be generated.

Furthermore, the dictionary means is adapted to store therein the idioms of the first language in such a manner that a principal fixed portion of each of the idioms can be distinguished from a supplementary fixed portion thereof, and the dictionary lookup means is adapted to generate part-of-speech information for each word and syntactical information including type information assigned to the fixed portions in the word sequence of the idiom identified with one of the headers for distinguishing the principal fixed portion from the supplementary fixed portion and pointer information indicative of interrelation between words in the input word sequence. Therefore, there is no need to define any special grammatical rule, and a split idiom can be translated in the same manner as an unsplit idiom which can be processed by using ordinary grammatical rules.

BRIEF DESCRIPTION OF THE DRAWINGS

FIG. 4 is a diagram for explaining an exemplary registration of idioms;

FIG. 5 is a diagram for explaining another exemplary registration of idioms;

FIG. 6 is a diagram for explaining an exemplary representative symbol table;

FIG. 9 is a schematic diagram for explaining information retained in a dictionary lookup result buffer A;

FIG. 10 is a schematic diagram for explaining information retained in a dictionary lookup result buffer A;

FIG. 11 is a schematic diagram for explaining information retained in the dictionary lookup result buffer A after the idiom processing process;

FIG. 12 is a schematic diagram for explaining information retained in the dictionary lookup result buffer A after the idiom processing process;

FIG. 13 is a schematic diagram for explaining information retained in the dictionary lookup result buffer A;

FIG. 14 is a schematic diagram for explaining information retained in the dictionary lookup result buffer A after the idiom processing process;

FIG. 15 is a diagram for explaining prior-art representative symbols; and

FIG. 16 is a diagram for explaining a case where one syntactical relation crosses the other syntactical relation.

DESCRIPTION OF THE PREFERRED EMBODIMENTS

In view of the foregoing, it is an object of the present invention to provide a machine translation system which has a function of processing a split idiom including a word sequence (or phrase) as a variable portion by expressing the split idiom by an idiom header having fixed portions and variable portion and normalizing a word arrangement of the fixed portions. Such machine translation system does not require special grammatical rules, nor a recursive process such as of the prior art to process candidate phrases for the variable portions of the split idiom in an input source text.

Figure 1:
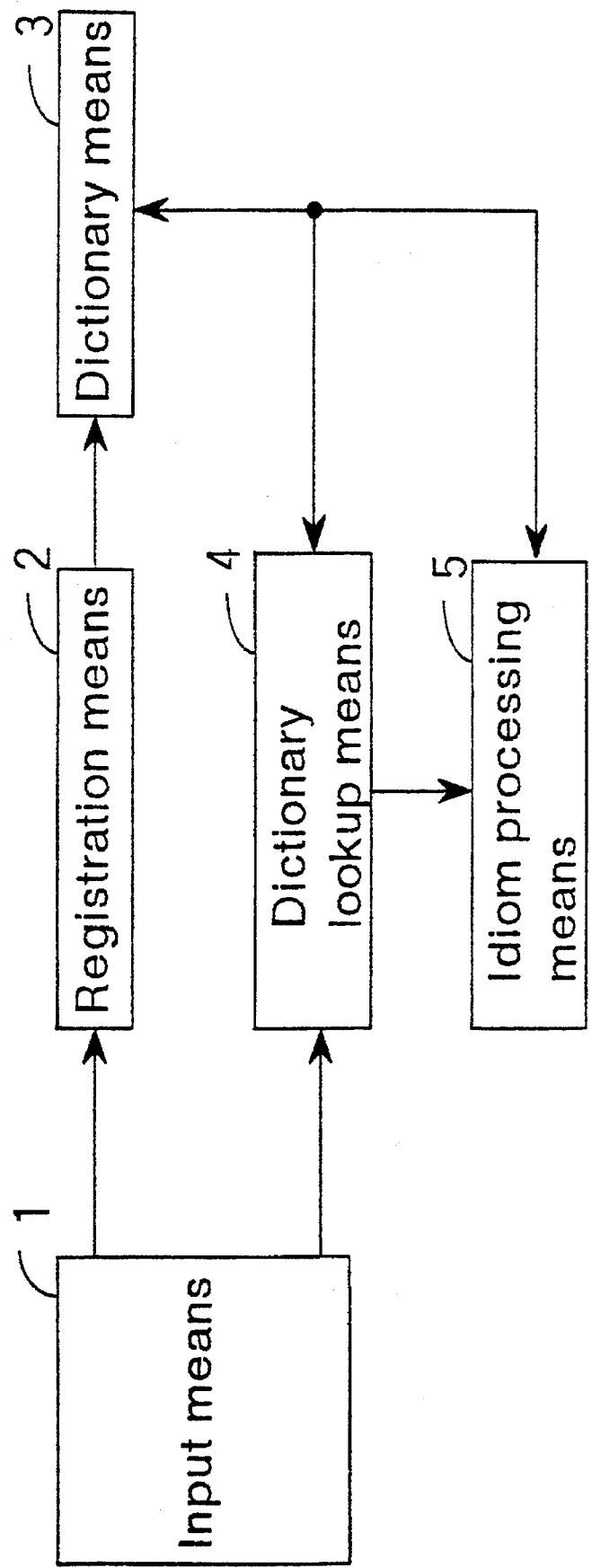
FIG. 1 is a block diagram illustrating a fundamental structure of a machine translation system in accordance with the present invention.

FIG. 1 is a block diagram illustrating a fundamental structure of a machine translation system in accordance with the present invention.

As shown, a machine translation system having an idiom processing function includes: an input means 1 for inputting a word sequence of a first language; a dictionary means 3 for storing therein idioms of the first language including at least two fixed portions and variable portion interposed therebetween as headers and translated expressions in a second language corresponding to the respective headers; a registration means 2 for newly or additionally registering a header of the first language and translated expressions in the second language corresponding to the header into the dictionary means; a dictionary lookup means 4 for retrieving a header corresponding to an idiom included in the word sequence of the first language input by the input means from the headers stored in the dictionary means 3 by comparing the word sequence of the first language with each of the headers; and an idiom processing means 5 for normalizing an arrangement of fixed portions in a word sequence of the first language which is identified with one of the headers by the dictionary lookup means 4.

Preferably, the dictionary means 3 is adapted to store therein the idioms of the first language in such a manner that a principal fixed portion of each of the idioms can be distinguished from a supplementary fixed portion thereof, and the dictionary lookup means 4 is adapted to generate speech-of-part information for each word and syntactical information including type information assigned to the fixed portions in the word sequence of the idiom identified with one of the headers for distinguishing the principal fixed portion from the supplementary fixed portion and pointer information indicative of interrelation between words in the input word sequence.

Preferably, the idiom processing means 5 is adapted to prepare information for presuming that a word corresponding to the supplementary fixed portion selected from words identified with the fixed portions of the header of the idiom has been moved to a position of a word corresponding to the principal fixed portion in the input word sequence and add the information to a word other than the word corresponding to the supplementary fixed portion to transform the syntactical information when normalizing the arrangement of fixed portions of the idiom.

Alternatively, the idiom processing means 5 may be adapted to prepare information for presuming that a word corresponding to the supplementary fixed portion selected from words identified with the fixed portions of the header of the idiom has been deleted from the input word sequence, and add the information to a word other than the word corresponding to the supplementary fixed portion to transform the syntactical information when normalizing the arrangement of the fixed portions of the idiom.

Preferably, a translation generating means generates a translation of a second language from the syntactical information transformed by the idiom processing means 5.

And, the translation is output by a output means which includes a display, printer and the like.

Exemplary input devices used as the input means 1 shown in FIG. 1 include a keyboard, pointing devices and the like, but not limited thereto. Exemplary memory devices used as the dictionary means 3 include an ROM, RAM and flexible disk, hard disk and the like, but not limited thereto.

The dictionary means 3 is of the type which is commonly used for translation and serves to store therein headers each including a word or a word sequence of the first language and a translated expression in the second language in a pair. Other than such information, the dictionary means 3 may include part-of-speech information and information required for retrieval of a header. Preferably, the dictionary means 3 is designed so that a user can additionally register a header and a translated expression corresponding thereto, or update the dictionary registration.

Typically employed as the registration means 2, dictionary lookup means 4 and idiom processing means 5 is a CPU or microprocessor including peripheral circuits such as an ROM, RAM and I/O interface. Programs for controlling the operations of the machine translation system are preferably incorporated in the ROM or RAM.

Practically, the machine translation function realized by these means above mentioned in this invention is incorporated in word processors, personal computers or exclusive machines for translation.

Idioms herein defined include idiomatic expressions, idiomatic phrases, set phrases, phrases consisting of correlative words and the like which are commonly used in daily life.

Idioms of the first language including at least two fixed portions and a variable portion interposed therebetween are herein called "split idioms". A split idiom, for example, has a first fixed portion, first variable portion, second fixed portion and second variable portion arranged in this order, and the first and second fixed portions thereof are thus separated.

The fixed portion is a predetermined word or word sequence (fixed word or word sequence) in an idiom, and the variable portion is a word or word sequence (variable word or word sequence) which varies depending on an input sentence.

The principal fixed portion is a word or word sequence which plays the most important part in the plural fixed portions of the idiom when the idiom is translated, and the supplementary fixed portion is a portion other than the principal fixed portion.

In a split-idiomatic expression "so hot that children cannot drink it", for example, words "so" and "that" are fixed portions, and a word "hot" and a clause "children cannot drink it" are variable portions. Of the fixed portions, the word "so" is a supplementary fixed portion, and the word "that" is a principal fixed portion.

Normalizing an arrangement of fixed portions means that a word or word sequence of one fixed portion in a position apart from another fixed portion is deleted or moved within a split idiom, or a variable portion is moved so that the idiom can be regarded as having a single fixed portion, and then the resultant word arrangement is stored.

For example, the arrangement of the words in the input word sequence is normalized by performing at least one of the following processes:

(1) Any of the fixed portions included in the input word sequence is deleted;
(2) Plural words or word sequences corresponding to the variable portions in the input word sequence are moved to different positions;
(3) The first fixed portion included in the input word sequence is moved just before the second fixed portion; and
(4) The second fixed portion included in the input word sequence is moved just after the first fixed portion.

There will hereinafter be detailed the present invention by way of an embodiment thereof with reference to the attached drawings. It should be noted that the embodiment is not limitative of the invention.

Figure 2:
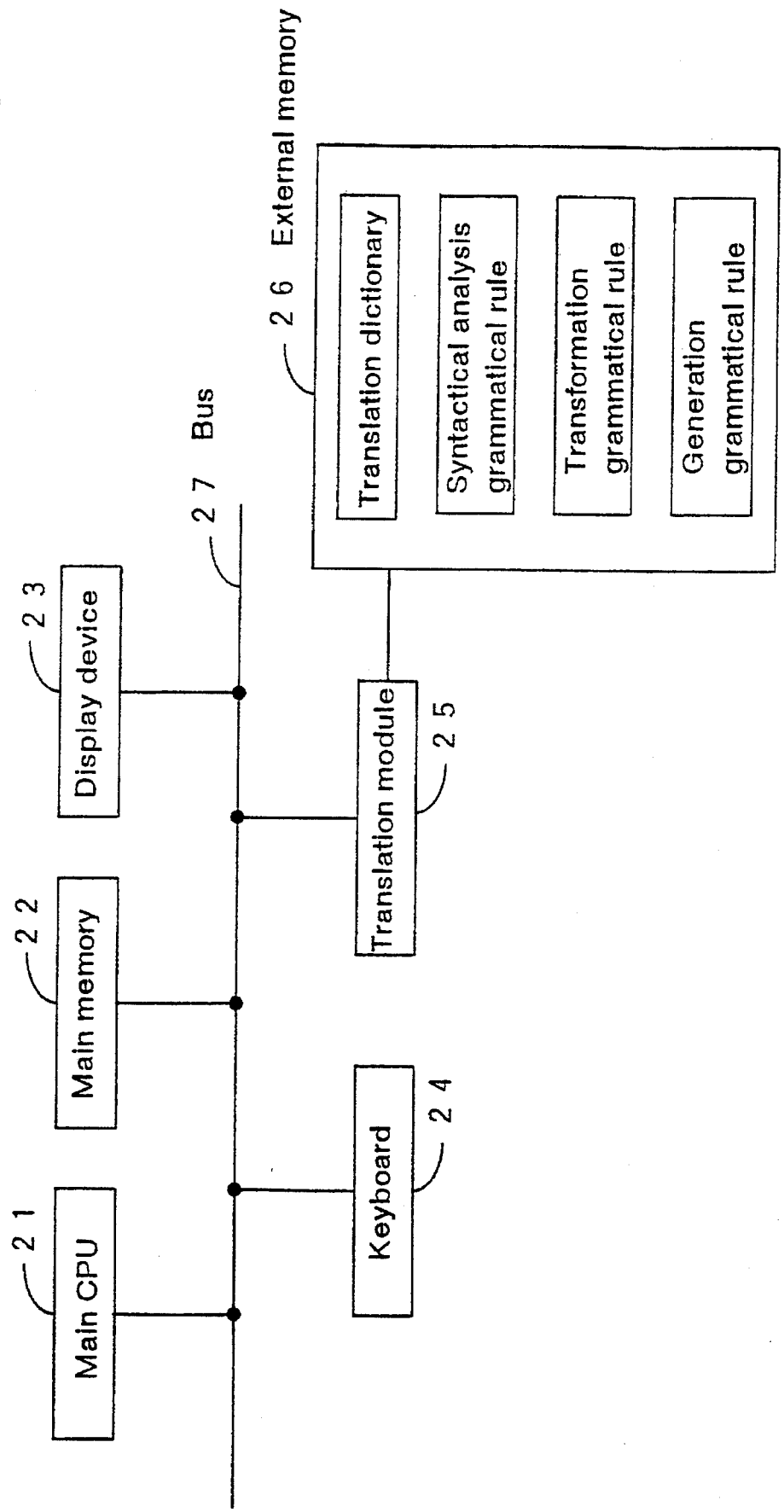
FIG. 2 is a block diagram illustrating a structure of a machine translation system in accordance with one embodiment of the present invention.

FIG. 2 is a block diagram illustrating a structure of a machine translation system in accordance with the embodiment of the present invention.

The machine translation system includes a main CPU (central processing unit) 21, a bus 27 through which the main CPU 21 and other components are connected with each other, a main memory (including memory buffers) 22 connected to the bus 27, a display device 23 (CRT (cathode ray tube), LCD (liquid crystal display) or the like) connected to the bus 27, a keyboard 24, a translation module 25 connected to the bus 27, and an external memory 26 connected to the translation module 25 for storing therein a translation dictionary, syntactical analysis grammatical rule, transformation grammatical rule and generation grammatical rule.

The translation module 25 serves to translate an input sentence from a source language to a target language in accordance with a predetermined procedure.

Figure 3:
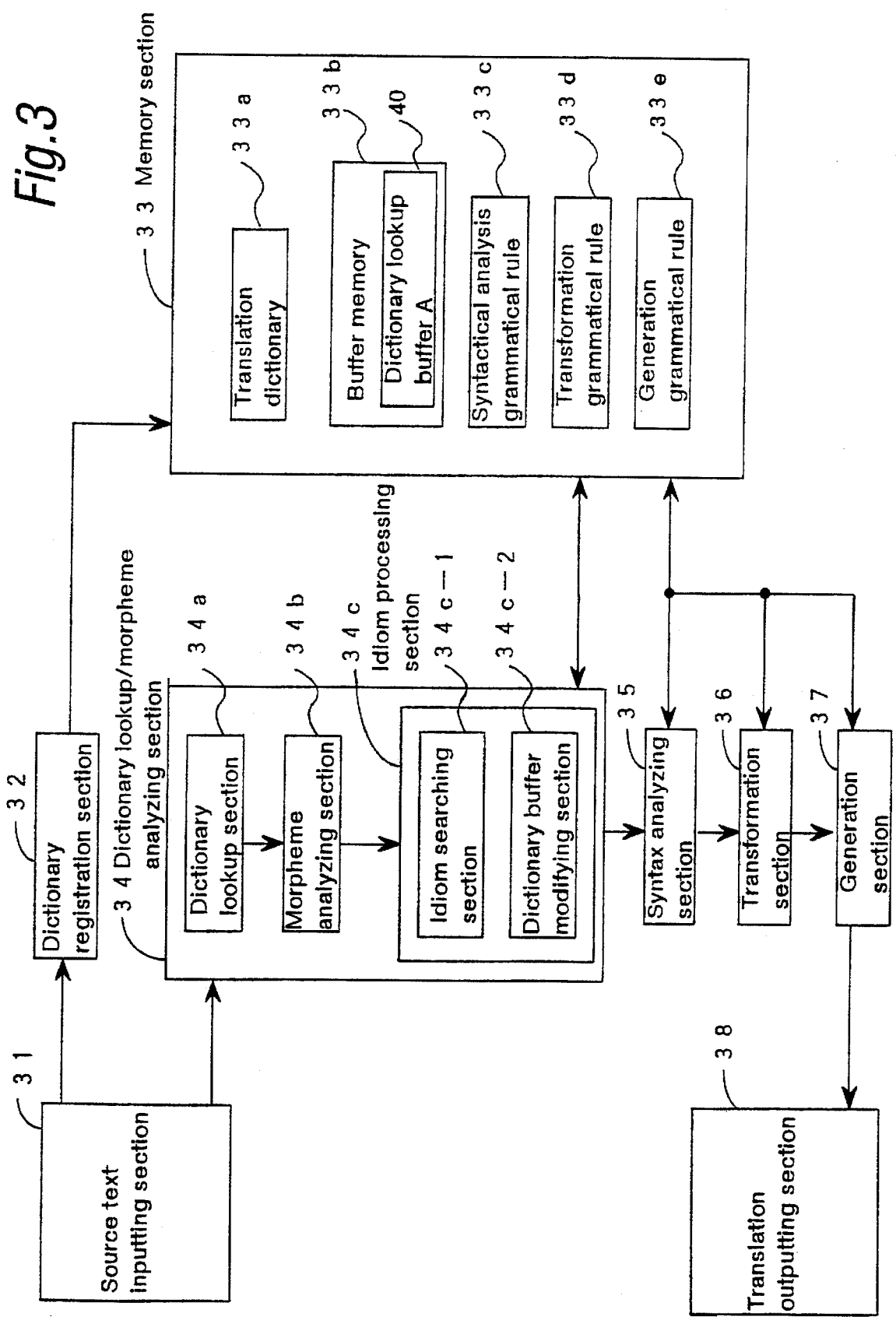
FIG. 3 is block diagram for explaining each function.

FIG. 3 is a block diagram illustrating the structure of the translation module 25 of the machine translation system in accordance with the present invention.

A source text inputting section 31 serves to accept an input source text to be translated, and corresponds to the keyboard 24 shown in FIG. 2.

A dictionary registration section 32 serves to add, modify and delete dictionary information such as dictionary headers and translated words or expressions stored in a memory section 33, and is embodied by the main CPU 21 shown in FIG. 2.

The memory section 33 includes a translation dictionary 33a, buffer memory 33b, syntactical analysis grammatical rule 33c, transformation grammatical rule 33d and generation grammatical rule 33e, and corresponds to the main memory 22 and external memory 26 shown in FIG. 2.

The main memory 22 serves to store therein various kinds of information utilized in the machine translation system, and an RAM is typically employed as the main memory 22.

The external memory 26 serves to store therein the translation dictionary 33a, syntactical analysis grammatical rule 33c, transformation grammatical rule 33d and generation grammatical rule 33e, and a hard disk or flexible disk is typically employed as the external memory 26.

A translation outputting section 38 serves to output a translation generated by the translation module, and corresponds to the display device 23 shown in FIG. 2, printer or the like.

The translation module 25 shown in FIG. 2 includes a dictionary lookup/morpheme analyzing section 34, syntax analyzing section 35, transformation section 36 and generation section 37.

The dictionary lookup/morpheme analyzing section 34 serves to divide the source text input from the source text inputting section 31 into morphemes (word sequences), then obtain morphemic information including grammatical information such as a part of speech of each word and a translated expression corresponding to the word, and analyze information such as of a tense, person and number.

The syntax analyzing section 35 serves to determine a syntactical analysis tree indicative of syntactical relations between respective words in the source text in accordance with the obtained morphemic information and the grammatical rules. The transformation section 36 serves to transform the syntactical analysis tree for the input source text into a syntactical analysis tree for a translated text. The generation section 37 serves to build a sentence structure for the target language in accordance of the generation grammatical rule for the target language, then add appropriate particles and auxiliary verb to generate a correct translation and output the generated translation.

The dictionary lookup/morpheme analyzing section 34 includes a dictionary lookup section 34a for searching the translation dictionary 33a in the memory section 33, a morpheme analyzing section 34b for performing a morpheme analyzing process for the source text based on information obtained from the dictionary, and an idiom processing section 34c for processing a split idiom.

The idiom processing section 34c includes an idiom searching section 34c-1 and a dictionary lookup result buffer modifying section 34c-2 for deleting or moving a word corresponding to a supplementary fixed portion selected from words of the fixed portions of the idiom.

Though not shown in the block diagram, the translation module 25 of the aforesaid structure includes a translation CPU for performing operations in the respective sections within the translation module, i.e., for performing a socalled translation process, a program memory for storing therein a program for translation process, and a buffer for storing therein information such as part-of-speech information and translated words necessary for the execution of the translation process.

Preferably, an ROM is employed as the program memory, and an RAM is employed as the buffer. The functions of the respective sections in the translation module 25 are performed by the translation CPU.

A so-called MPU (multiprocessing unit) including an RAM, ROM, input/output interface and timer can otherwise be used as the main CPU 21 and translation CPU.

FIGS. 4 and 5 are diagrams for explaining an exemplary idiom registration process in which split idioms are registered in the translation dictionary by the dictionary registration section 32 in accordance with this embodiment.

FIG. 6 is a diagram for explaining an exemplary representative symbol table in accordance with this embodiment. For example, a symbol "*n" means a character string of a single noun word, and a symbol "*N" means a noun phrase including one or more words.

Word sequences [1a], [1b], [2a], [2b], [2c] and [3a] of split idioms shown in FIGS. 4 and 5 are registered for processing the split idioms included in the aforedescribed sentences (1a), (1b), (2a), (2b), (2c) and (3a), respectively.

"English" representing a registered English header includes, for example, an English word sequence [1a] "both *N1 and* *N2", in which the words "both" and "and" are fixed portions, and symbols "*N1" and "*N2" are variable portions in the header and are defined as nouns or noun phrases.

When a plurality of variable portions are represented by the same representative symbol, the representative symbol accompanies numerals 1, 2, ... sequentially assigned to the respective variable portions from the first variable portion to indicate the interrelation between each of the variable portions in the idiom and that in a translated expression. A mark "*" attached at the end of the word "and" indicates that the word "and" is a principal fixed portion of the split idiom, i.e., a fixed portion that is not subject to deletion.

"English part of speech" indicates an English part of speech assigned to each of the headers. "English part of speech 2" indicates an English part of speech inserted in a position of a principal fixed portion after a supplementary fixed portion is deleted. "Translation attribution" indicates an attribution to be assigned to a translated expression when the header is employed. In case of the sentence (1b), for example, the attribution serves as an instruction for the generation section to generate a negative sentence.

Next, there will be described the translation process in accordance with the present invention with reference to flow charts shown in FIGS. 7 and 8. It is herein assumed that the sentence (1a) "I have both A and B" is input as a source sentence from the source text inputting section 31 shown in FIG. 3. It is further assumed that split idioms shown in FIGS. 4 and 5 are registered into the translation dictionary 33a.

In step S2, the translation dictionary 33a shown in FIG. 3 is searched for a character string in the source sentence (1a) input in step S1. If the part of speech of a retrieved header is not "CD" (split idiom), the process goes into step S5 from judgment step S3, and dictionary information of the retrieved header is retained in the dictionary lookup result buffer A 40 reserved in the buffer memory 33b of the memory section 33 shown in FIG. 3.

In judgment step S6, it is judged if the input sentence has been processed up to the end thereof (or up to the end portion represented by "."). If NO, the process returns to step S2, and steps S2 through S6 are repeated. When the translation dictionary 33a is searched for a character string "both" in the input sentence, a registered header [1a] "both *N1 and_* *N2" shown in FIG. 4 is retrieved.

Since the part of speech of the header is "CD" (split idiom), the process goes into step S4, and it is checked if the other fixed portion defined in the English header in the dictionary, i.e., a character string "and_*" is present in a position behind a currently processed word position in the source sentence, to check the applicability of the retrieved split idiom. In the character strings defined in the header, character strings that begin with "*" are variable portions, and character strings other than the variable portions are fixed portions. A mark "_*" in the character string "and_*" is an identifier indicative of a principal fixed portion. In this case, it is judged if a character string excluding the identifier, i.e., "and" is present in the source sentence.

In judgment step S4, it is judged that "and" defined as the fixed portion is present in the source sentence, and the process goes into step S5. This dictionary information is retained in the dictionary lookup result buffer A 40.

In step S5, a pointer indicative of the position of the next fixed portion is set to "4/0", since the part of speech of the header is "CD".

Generally, a pointer x/y indicates a word position x and part-of-speech candidate y. The character string "both" in the source sentence does not serve as a principal fixed portion in the header "both *N1 and_* *N2" and, therefore, a flag indicative of the type of the fixed portion (principal fixed portion "P" or supplementary fixed portion "S") is set to "S". If a character string serves as a principal fixed portion, the flag is set to "P".

The steps S2 through S6 are repeated until the input sentence is processed up to the end portion ".". Then, the dictionary information is generated in the dictionary lookup result buffer A as shown in FIG. 9.

The process sequence from step S1 to step S6 is performed by the dictionary lookup section 34a.

In FIG. 9, numerals shown in "Word position" indicate a numerical order of respective words in the input source sentence retained in the buffer.

Numerals 0, 1, 2 and 3 shown in "Candidate" indicate candidate numbers assigned to probable parts of speech of each of the character strings in the input source sentence which are retrieved in the dictionary lookup process. For example, a word "have" has two part-of-speech candidates. Information of "Word number", "Part of speech", "Type" and "Pointer" is retained in the buffer for every part-of-speech candidate of respective words.

A numeral shown in "Word number" indicates the number of words included in a word sequence or a word registered in the dictionary. A period, comma, colon and semicolon are counted as one word.

Since the source sentence (1a) is divided word by word, all the word numbers are one as shown in FIG. 9. If a word sequence resulting from the division of the source sentence consists of a plurality of words, the word number is represented by the number of spaces between the words plus one.

For example, the word number of a word sequence "high speed machine" is "3". The word number indicates a word connection defined by a dictionary lookup result. The word sequence "high speed machine" having a word number "3" is regarded as one word and followed by the subsequent word.

Codes shown in "Part of speech" indicate possible parts of speech assigned to each of the words in the source sentence as shown in FIG. 4. "Type" indicates whether each of the words serves as a principal fixed portion or as a supplementary fixed portion in the header, as previously mentioned. If the word serves as the principal fixed portion, the type is set to "P", and if not, the type is set to "S".

Alternatively, the type flag may be set to "1" for the type "P", and to "0" for the type "S".

"Pointer" indicates the position of the next fixed portion as stated above. In FIG. 9, a pointer "4/0" indicates that the next fixed portion is a part-of-speech candidate No. 0 of the word "and" in a word position No. 4, i.e., the word "and" which has "Word number"=1 and "Speech part"=CC.

When the sentence (2a) "This is so hot that children cannot drink it" is input in step S1, the sentence (2a) is processed in substantially the same manner as described above by the dictionary lookup section 34a, and a dictionary lookup result buffer A-2 as shown in FIG. 10 is generated.

More specifically, in step S2, the translation dictionary 33a shown in FIG. 3 is searched for a character string in the sentence (2a) input in step S1. If the part of speech of a retrieved header is not "CD" (split idiom), the process goes into step S5 from judgment step S3, and dictionary information is stored in the dictionary lookup result buffer A 40 shown in FIG. 3.

The steps S2 through S6 are repeated until the input sentence (2a) is processed up to the end thereof (or up to the end portion represented by "."). When the translation dictionary 33a is searched for a character string "so" in the input sentence (2a) in step S2, a registered header [2a] "so *A that_* *C" shown in FIG. 4 is retrieved. Since the part of speech of the header is "CD" (split idiom), the process goes into step S4, and it is checked if the other fixed portion defined in the English header in the dictionary, i.e., a word "that" is present in a position behind a currently processed word position in the source sentence, to check the applicability of the retrieved split idiom.

In judgment step S4, it is judged that the word "that" defined as the fixed portion is present in the source sentence, and the process goes into step S5. Then, this dictionary information is retained in the dictionary lookup result buffer A 40.

In step S5, a pointer indicative of the position of the next fixed portion is set to "4/0", since the part of speech of the header is "CD". The character string "so" in the source sentence does not serve as a principal fixed portion in the header "so *A that_* *C" and, therefore, the flag indicative of the type of the fixed portion is set to "S".

The steps S2 through S6 are repeated until the input sentence is processed up to the end portion ".". Then, the dictionary information is generated in the dictionary lookup result buffer A-2 shown in FIG. 10.

In the sentence (3a) "This is so designed that everyone can operate it easily." shown in FIG. 16, words "is" and "designed" constitute a passive-voice verbal phrase, and words "so" and "that" constitute a subordinate conjunction. Since the syntactical relation of the former crosses the syntactical relation of the latter, the prior-art system cannot correctly translate the sentence (3a), as previously mentioned. In accordance with the present invention, when the sentence (3a) is input, the translation dictionary 33a is searched for a registered header [3a] as shown in FIG. 5 in step S2 shown in FIG. 7, and a dictionary lookup result buffer A-3 shown in FIG. 13 is generated.

The part of speech of the word "so" in a word position No. 2 is "CD" (split idiom), and the type thereof is "S" indicative of a supplementary fixed portion. The pointer thereof is "4/0" which indicates that the word "so" relates to a part-of-speech candidate No. 0 of the word "that" in a word position No. 4.

Figure 7:
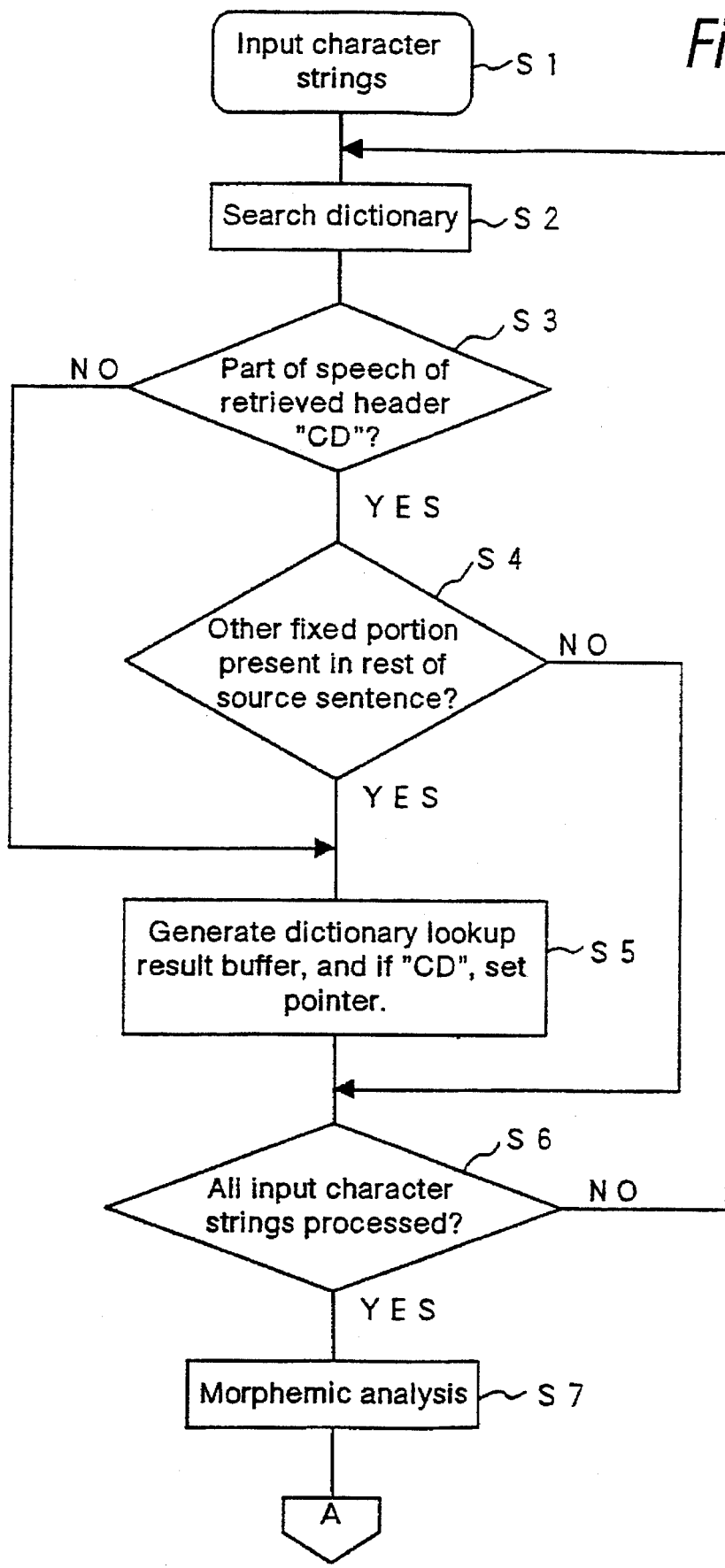
FIG. 7 is a flow chart illustrating a dictionary lookup process and morpheme analyzing process in accordance with the present invention.

After this dictionary lookup process, a morphemic analysis is carried out in a conventional way to determine grammatical attribution such as number, person and tense of each word in step S7 shown in FIG. 7.

Figure 8:
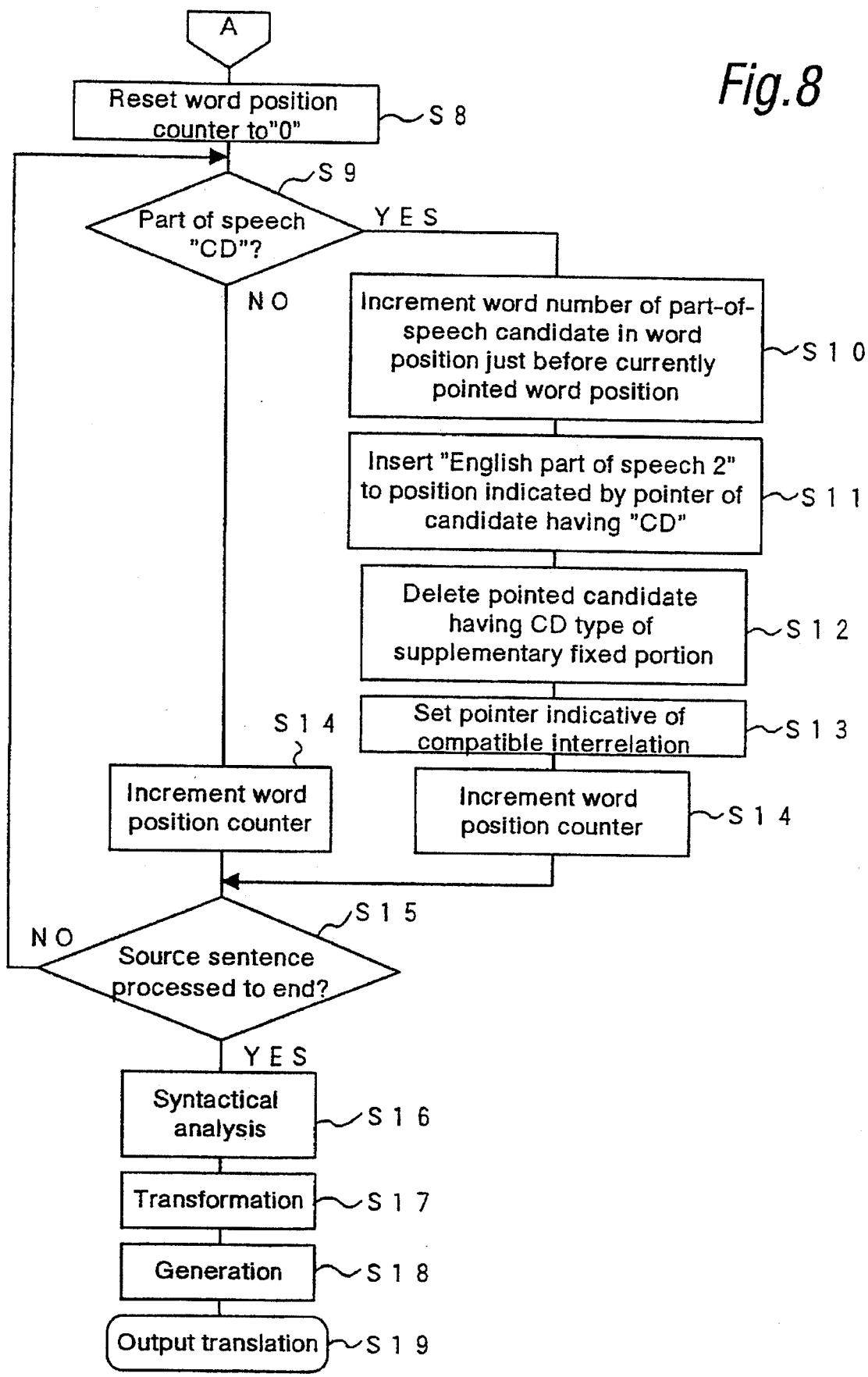
FIG. 8 is a flow chart illustrating an idiom processing process in accordance with the present invention.

Then, the idiom processing section 4c performs a process sequence from step S8 to step S15 shown in FIG. 8. The information retained in the dictionary lookup result buffer shown in FIG. 9 or 10 is input to the idiom processing section 4c.

In step S8, a word position counter is reset to "0". Then, it is checked if a word located in a currently pointed word position has a part-of-speech candidate of "CD". If NO, the process goes into step S14. Then, the word position counter is incremented, and the next word is checked.

Referring again to the first case where the sentence (1a) is processed, when the word position counter is incremented to "2" (which indicates a word position No. 2) in the dictionary lookup result buffer A-1, the process goes into step S10, because the word "both" in the word position No. 2 has a part-of-speech candidate having "CD". In step S10, new part-of-speech candidates are generated for the word "have" in a word position just before the currently pointed word "both" by copying existing part-of-speech candidates of the word "have" and then the word numbers of the new part-of-speech candidates are rewritten to "2" (the word number of the word "have" (i.e., 1) plus the word number of the word "both" (i.e., 1)).

FIG. 11 shows the information included in the dictionary lookup result buffer A-1 after the generation of the new part-of-speech candidates for the word "have". As shown, information of part-of-speech candidates No. 0 and No. 1 of the word "have" are copied to part-of-speech candidates No. 2 and No. 3, respectively, and the word numbers of the part-of-speech candidates No. 0 and No. 1 are rewritten to "2".

That is, a word sequence "have both" consisting of the two words "have" and "both" is considered to be a single word group and looks as if the word "both" had been deleted.

Thus, the part-of-speech candidate No. 1 of the word "have" in a word position No. 1 which has a part-of-speech of "VB" directly relates to a word "A", skipping the word "both". There are generated two part-of-speech candidates for excluding the word "both" (part-of-speech candidates No. 0 and No. 1 in the word position No. 1) and two part-of-speech candidates for including the word "both" (part-of-speech candidates No. 2 and No. 3 in the word position No. 1), i.e., the word "have" has four part-of-speech candidates in total.

In step S11, an English part of speech 2 "CC" of the header "both *N1 and_* *N2" is inserted as a part of speech of the part-of-speech candidate No. 0 of the word "and" in the word position No. 4, which is indicated by a pointer "4/0" (shown in FIG. 9) of a part-of-speech candidate No. 0 (having a part of speech "CD") of the word "both" in the currently pointed word position No. 2.

FIG. 11 shows a state of the dictionary lookup result buffer A-1 after "CC" is inserted. In this case, however, the part of speech of the word "and" is initially "CC" as shown in FIG. 9 and, hence, there is virtually no change in the part of speech thereof.

In step S12, the part-of-speech candidate No. 0 of the word "both" in the currently pointed word position (shown in FIG. 9) is deleted, since a flag thereof is set to "S" indicative of a supplementary fixed portion. Then, the rest of the part-of-speech candidates are moved to the left to fill the vacant position.

More specifically, the candidate of the word "both" having a part-of-speech "CD" shown in FIG. 9 is deleted, and the rest of the part-of-speech candidates are moved to the left to fill the vacant position as shown in FIG. 11.

However, the part-of-speech candidates of the words added into the word positions No. 1 and No. 4 are not necessarily compatible with all the part-of-speech candidates in the other word positions. The part-of-speech candidates No. 0 and No. 1 of the word "have" should be compatible with the part-of-speech candidate No. 0 of the word "and", while they are incompatible with the part-of-speech candidate No. 1 of the word "and".

Therefore, a pointer indicative of an interrelation between the words (either compatible interrelation or incompatible interrelation) is set for each of the part-of-speech candidates of the words "have" and "and" in the word positions No. 1 and No. 4. More specifically, the pointers of the part-of-speech candidates No. 0 and No. 1 of the word "have" are set to "4/0", and the pointer of the part-of-speech candidate No. 0 of the word "and" is set to "1/0" and "1/1".

The pointer indicates a compatible interrelation, and is represented by x/y, which means the part-of-speech candidate of a word is compatible with a part-of-speech candidate "y" of another word in a word position "x". The state of the dictionary lookup result buffer A-1 after the pointer is set is shown in FIG. 11.

As shown, the part-of-speech candidate No. 0 of the word "and" having a part of speech "CC" is compatible with the part-of-speech candidates No. 0 and No. 1 of the word "have", while it is incompatible with the part-of-speech candidates No. 2 and No. 3 of the word "have".

In step S14, the word position counter is incremented, and it is checked if "CD" exists in the rest of the source text.

When the source text is processed up to the end thereof, steps S16 through S19 are performed, and the idiom processing process ends.

As described above, the steps S8 through S15 are performed by the idiom processing section 34c. More specifically, the steps S8 and S9 are performed by the idiom searching section 34c-1 and the steps S10 through S14 are performed by the dictionary buffer modifying section 34c-2.

Referring again to the second case where the sentence (2a) "This is so hot that children cannot drink it" is input, when the dictionary lookup process is finished in substantially the same manner as the first case, the morphemic analysis is performed in step S7 to determine grammatical attribution such as number, person and tense of each of the words.

Then, the aforesaid steps S8 through S15 are performed by the idiom processing section 34c. When the word position counter is incremented to "2" (which indicates a word position No. 2) in the dictionary lookup result buffer A-2, a new part-of-speech candidate is generated for a word "is" located in a word position just before the currently pointed word "so" by copying an existing part-of-speech candidate of the word "is" and then the word number of the new part-of-speech candidate is rewritten to "2" (the word number of the word "is" (i.e., 1) plus the word number of the word "so" (i.e., 1)).

Thus, a part-of-speech candidate No. 1 of the word "is" in the word position No. 1 which has a part of speech "BE" directly relates to a word "hot", skipping the word "so". There are generated a candidate for excluding the word "so" (part-of-speech candidate No. 0 in the word position No. 1) and a candidate for including the word "so" (part-of-speech candidate No. 1 in the word position No. 1).

In step S11, a second part of speech in English "AC" of the header "so *A that_* *C" is inserted as a part-of-speech candidate No. 0 of the word "that" in a word position No. 4, which is indicated by a pointer "4/0" (shown in FIG. 10) of a part-of-speech candidate No. 0 (having a part of speech "CD") of the word "so" in a currently pointed word position No. 2. FIG. 12 shows a current state of the dictionary lookup result buffer A-2 after "AC" is inserted.

In step S12, a part-of-speech candidate No. 0 of the word "so" in a currently pointed word position (shown in FIG. 10) is deleted as shown in FIG. 19, since a flag is set to "S" indicative of a supplementary fixed portion. Then, the rest of the part-of-speech candidates are moved to the left to fill the vacant position.

However, the part-of-speech candidates of the words added into the word positions No. 1 and No. 4 are not necessarily compatible with all the part-of-speech candidates in the other word positions. The part-of-speech candidate No. 0 of the word "is" should be compatible with the part-of-speech candidate No. 0 of the word "that", while it is incompatible with the part-of-speech candidates No. 1, No. 2 and No. 3 of the word "that".

Therefore, in step S13, a pointer indicative of an interrelation between the words (either compatible interrelation or incompatible interrelation) is set for each of the part-of-speech candidates of the words "is" and "that" in the word positions No. 1 and No. 4.

In FIG. 12 illustrating the state of the dictionary lookup result buffer A-2, the part-of-speech candidate No. 0 of the word "that" having a part of speech "AC" is compatible with the part-of-speech candidates No. 0, while it is incompatible with the part-of-speech candidate No. 1 of the word "is".

In step S14, the word position counter is incremented, and it is checked if "CD" exists in the rest of the source text. Then, the steps S9 through S15 are repeated until the source text is processed up to the end thereof.

Referring again to the third case where the sentence (3a) "This is so designed that everyone can operate it easily", the dictionary lookup result buffer A-3 shown in FIG. 13 is modified as shown in FIG. 14.

As shown in FIG. 14, a part-of-speech candidate is inserted as a part-of-speech candidate No. 0 of a word "that" in a word position No. 4. More specifically, the inserted part-of-speech candidate No. 0 of the word "that" has a word number "1", a part of speech "AC", a type "P" indicative of a principal fixed portion, and a pointer "1/0" indicating that the part-of-speech candidate No. 0 of the word "that" relates to the part-of-speech candidate No. 0 of the word "is" in the word position No. 1.

After the aforesaid process is completed, in step S16, a syntactical analysis is carried out by the syntax analyzing section 35. More specifically, the syntax of the source sentence is determined with reference to the syntactical analysis grammatical rule 33c stored in the memory section 33 shown in FIG. 3. The word sequence of the input source text has already been normalized by modifying the dictionary lookup result buffer, and hence has a specially arranged word sequence.

The normalization means that a fixed portion other than a principal fixed portion (supplementary fixed portion) is deleted from the split idiom included in the input word sequence. The arrangement of words of the input sentence is modified so that the split idiom may be considered to be an idiom having a single fixed portion. Therefore, no special grammatical rule for processing a sentence having an uncommon part-of-speech arrangement is required to process the postmodification idiom. The syntactical analysis of the sentence thus normalized is carried out in accordance with a commonly used grammatical rule, and then a syntactical analysis tree is generated.

Alternatively, the arrangement of constituent words of the split idiom may be modified in accordance with another normalization process. Similarly to the aforesaid case, the split idiom can be syntactically analyzed in accordance with the commonly used grammatical rule.

In this syntax analyzing process, it is checked that the part-of-speech candidate No. 1 of the word "have" and the part-of-speech candidate No. 1 of the word "and", for example, do not exist in the same syntactical analysis tree, with reference to the pointer indicative of compatible/ incompatible interrelation between words which is set in the dictionary lookup result buffer.

After the syntactical analysis tree is generated by way of syntactical analysis, the parts of speech of variable portions represented by the representative symbols for idiom registration are checked. In case of the idiom "both *N1 and_* *N2", for example, it is checked if the principal fixed portion "and" is interposed between noun phrases represented by a symbol "*N". If NO (the syntactical analysis is unsuccessful), the syntactical analysis tree employing this idiom is abandoned, because the syntax represented by the syntactical analysis tree cannot exist.

In the first case where the sentence (1a) "I have both A and B" is input, the variable portions "A" and "B" are noun phrases as can be seen from the dictionary lookup result buffer A-1 shown in FIG. 11 and, therefore, the syntactical analysis is successfully carried out.

Thereafter, the transformation process is performed by the transformation section 36 in step S17, and the generation process is performed by the generation section 37 in step S18. The translated expression in Japanese corresponding to the English idiom is obtained, then the variable portions "*N1" and "*N2" are replaced with translated words "A" and "B", respectively, and a final translation for the entire source sentence is obtained. Then, the translation result is output to the CRT or printer in step S19.

As can be understood from the foregoing, a supplementary fixed portion is deleted from an input source sentence by modifying information retained in the dictionary lookup result buffer A with reference to a symbol indicative of a principal fixed portion included in an idiom, and the input source sentence is normalized so as to be processed in accordance with a standard grammatical rule.

Therefore, a translation for the input source sentence including an idiom can correctly be generated.

Further, since the syntactical analysis is carried out after the information retained in the aforesaid dictionary lookup result buffer A is modified in accordance with the present invention, the throughput of translation process can be significantly improved, compared with the recursive translation process of the prior art in which the translation is done over again when it is found that an applied rule is not appropriate after the translation of a variable portion.

What is claimed is:

1. A machine translation system having an idiom processing function, comprising:

an input means for inputting a word sequence of a first language;

a dictionary means for storing therein idioms of the first language including at least two fixed portions and a variable portion interposed therebetween as headers and translated expressions in a second language corresponding to the respective headers;

a registration means for newly or additionally registering a header of the first language and translated expressions in the second language corresponding to the header into said dictionary means;

a dictionary lookup means for retrieving a header corresponding to an idiom included in the word sequence of the first language input by said input means from the headers stored in said dictionary means by comparing the word sequence of the first language with each of the headers; and an idiom processing means for normalizing an arrangement of fixed portions in a word sequence of the first language which is identified with one of the headers by said dictionary lookup means.

2. A machine translation system as set forth in claim 1, wherein said dictionary means stores therein the idioms of the first language in such a manner that a principal fixed portion of each of the idioms can be distinguished from a supplementary fixed portion thereof, and said dictionary lookup means generates part-of-speech information for each word and syntactical information including type information assigned to the fixed portions in the word sequence of the idiom identified with one of the headers for distinguishing the principal fixed portion from the supplementary fixed portion and pointer information indicative of interrelation between words in the input word sequence.

3. A machine translation system as set forth in claim 2, wherein said idiom processing means prepares information for presuming that a word corresponding to the supplementary fixed portion selected from words identified with the fixed portions of the header of the idiom has been moved to a position of a word corresponding to the principal fixed portion within the input word sequence, and adds the information to a word other than the word corresponding to the supplementary fixed portion to transform the syntactical information when carrying out the normalization.

4. A machine translation system as set forth in claim 2, wherein said idiom processing means prepares information for presuming that a word corresponding to the supplementary fixed portion selected from words identified with the fixed portions of the header of the idiom has been deleted from the input word sequence, and adds the information to a word other than the word corresponding to the supplementary fixed portion to transform the syntactical information when carrying out the normalization.

5. A machine translation system as set forth in claim 2, wherein said idiom processing means prepares information for presuming that words identified with the variable portions of the header of the idiom has been moved to different positions within the input word sequence, and adds the information to a word other than the words identified with the variable portions to transform the syntactical information when carrying out the normalization.

6. A machine translation system as set forth in claim 2, wherein the idioms of the first language stored in said dictionary means include a split idiom having at least two fixed portion and a variable portion interposed therebetween.

7. A machine translation system as set forth in claim 6, wherein, when a split idiom having first and second fixed portions and variable portion interposed therebetween is subjected to the normalization, said idiom processing means prepares information for presuming that a word corresponding to the supplementary fixed portion selected from the first and second fixed portions has been deleted, and adds the information to a word other than the word corresponding to the supplementary portion to transform the syntactic information.

8. A machine translation system as set forth in claim 2, further comprising:

a translation generating means for generating a translation from said syntactical information normalized by said idiom processing means; and an output means for outputting said translation.

* * * * *